(12) United States Patent
Chistyakov et al.

(10) Patent No.: US 11,403,396 B2
(45) Date of Patent: *Aug. 2, 2022

(54) SYSTEM AND METHOD OF ALLOCATING COMPUTER RESOURCES FOR DETECTION OF MALICIOUS FILES

(71) Applicant: AO Kaspersky Lab, Moscow (RU)

(72) Inventors: Alexander C. Chistyakov, Moscow (RU); Ekaterina M. Lobacheva, Moscow (RU); Alexey M. Romanenko, Moscow (RU)

(73) Assignee: AO Kaspersky Lab, Moscow (RU)

( * ) Notice: Subject to any disclaimer, the term of this patent is extended or adjusted under 35 U.S.C. 154(b) by 192 days.

This patent is subject to a terminal disclaimer.

(21) Appl. No.: 17/062,798

(22) Filed: Oct. 5, 2020

(65) Prior Publication Data
US 2021/0019406 A1 Jan. 21, 2021

Related U.S. Application Data

(63) Continuation of application No. 16/039,389, filed on Jul. 19, 2018, now Pat. No. 10,831,891.

(30) Foreign Application Priority Data

Aug. 10, 2017 (RU) ................................ 2017128537

(51) Int. Cl.
*G06F 21/56* (2013.01)
*G06F 21/57* (2013.01)
*G06N 20/00* (2019.01)

(52) U.S. Cl.
CPC ............ *G06F 21/561* (2013.01); *G06F 21/56* (2013.01); *G06F 21/563* (2013.01);
(Continued)

(58) Field of Classification Search
CPC ...... G06F 21/561; G06F 21/56; G06F 21/563; G06F 21/566; G06F 21/57; G06F 2221/033; G06N 20/00
See application file for complete search history.

(56) References Cited

U.S. PATENT DOCUMENTS

| 10,432,649 B1 * | 10/2019 | Bennett | G06F 16/285 |
| 2002/0166052 A1 * | 11/2002 | Garg | G06F 21/6218 |
| | | | 713/182 |

(Continued)

*Primary Examiner* — Ali S Abyaneh
(74) *Attorney, Agent, or Firm* — ArentFox Schiff LLP; Michael Fainberg

(57) ABSTRACT

The present disclosure provides a system and method for allocating computer resources for detection of malicious files. In one aspect, the system comprises: a hardware processor configured to: form at least one behavior pattern grouping selected commands with shared parameters, apply a hash function on the at least one of the formed behavior pattern to obtain computed parameters, calculate a degree of harmfulness based on the obtained computed parameters using the hash function and a model for detection of malicious files, wherein the degree of harmfulness is a number value characterizing a probability that a malicious activity will be manifested by a time of computing said degree of harmfulness and wherein the model is a machine learning model trained using computed parameters of previous behavior patterns on which the hash function was applied to output degrees of harmfulness, and allocate the computing resources based on the calculated degree of harmfulness.

18 Claims, 7 Drawing Sheets

Related U.S. Application Data

(60) Provisional application No. 62/573,938, filed on Oct. 18, 2017.

(52) U.S. Cl.
CPC ............ *G06F 21/566* (2013.01); *G06F 21/57* (2013.01); *G06N 20/00* (2019.01); *G06F 2221/033* (2013.01)

(56) References Cited

U.S. PATENT DOCUMENTS

| | | | |
|---|---|---|---|
| 2007/0174059 A1* | 7/2007 | Rhoads | G10L 25/48 |
| | | | 704/231 |
| 2016/0337390 A1* | 11/2016 | Sridhara | H04W 12/128 |
| 2017/0208085 A1* | 7/2017 | Steelman | G06N 3/0445 |
| 2017/0286861 A1* | 10/2017 | Kelly | G06N 20/00 |

\* cited by examiner

SYSTEM AND METHOD OF ALLOCATING COMPUTER RESOURCES FOR DETECTION OF MALICIOUS FILES

CROSS-REFERENCE TO RELATED APPLICATIONS

The present application is a continuation of and claims the benefit of priority to U.S. patent application Ser. No. 16/039,389, filed on Jul. 19, 2018, which claims benefit of priority to Russian Application No. 2017128537 which was filed on Aug. 10, 2017 and claims the benefit of priority of U.S. Provisional Application No. 62/573,938 filed on Oct. 18, 2017, all of which are herein incorporated by reference in their entirety.

FIELD OF TECHNOLOGY

The disclosure pertains to antivirus technologies, and more particularly to systems and methods for managing computing resources for detection of malicious files based on machine learning model. for allocating computer resources for detection of malicious files

BACKGROUND

The rapid development of computer technologies in the recent decade, as well as the widespread distribution of various computing devices (personal computers, notebooks, tablets, smartphones, etc.), have become a powerful impetus to the use of such devices in various spheres of activity and for an enormous number of tasks (from Internet surfing to bank transfers and electronic document traffic). In parallel with the growth in the number of computing devices and the software running on these devices, the number of malicious programs has also increased at a rapid pace.

At present, there exists an enormous number of varieties of malicious programs. Some of them steal personal and confidential data from the users of devices (such as logins and passwords, banking information, electronic documents). Others form so-called botnets from the devices of users for such attacks as denial of service (DDoS—Distributed Denial of Service) or to sort through passwords by the method of brute force on other computers or computer networks. Still others present paid content to users through intrusive advertising, paid subscriptions, the sending of SMS to toll numbers, and so on.

Specialized programs known as antiviruses are used in the struggle against malicious programs, including the detecting of malicious programs, the preventing of infection, and the restoration of the working capability of computing devices which have been infected with malicious programs. Antivirus programs employ various technologies to detect the full variety of malicious programs, such as:

- static analysis—the analysis of programs for harmfulness, including the running or emulating of the working of the programs being analyzed, on the basis of the data contained in files making up the programs being analyzed, whereby it is possible to use during statistical analysis:
  - signature analysis—the searching for correspondences of a particular segment of code of the programs being analyzed to a known code (signature) from a database of signatures of malicious programs;
  - white and black lists—the search for calculated check sums of the programs being analyzed (or portions thereof) in a database of check sums of malicious programs (black lists) or a database of check sums of safe programs (white lists);
- dynamic analysis—the analysis of programs for harmfulness on the basis of data obtained in the course of execution or emulation of the working of the programs being analyzed, whereby it is possible to use during dynamic analysis:
  - heuristic analysis—the emulation of the working of the programs being analyzed, the creating of emulation logs (containing data on the calls of API functions, the parameters transmitted, the code segments of the programs being analyzed, and so on) and the search for correspondences between the data of the logs created and the data from a database of behavioral signatures of malicious programs;
  - proactive protection—the intercepting of calls of API functions of the launched programs being analyzed, the creating of logs of the behavior of the programs being analyzed (containing data on the calls of API functions, the parameters transmitted, the code segments of the programs being analyzed, and so on) and the search for correspondences between the data of the logs created and the data from a database of calls of malicious programs.

Both static and dynamic analysis have their pluses and minuses. Static analysis is less demanding of resources of the computing device on which the analysis is being done, and since it does not use the execution or the emulation of the program being analyzed, statistical analysis is faster, but at the same time less effective, i.e., it has a lower percentage of detection of malicious programs and a higher percentage of false alarms (i.e., pronouncing a verdict that a file analyzed by the antivirus program is malicious, whereas it is safe). Dynamic analysis, since it uses data obtained during the execution or emulation of the working of the program being analyzed, is slower and makes higher demands on the resources of the computing device on which the analysis is being performed, but on the other hand it is also more effective. Modern antivirus programs employ a comprehensive analysis, including elements of both static and dynamic analysis.

Since modern standards of computer security rely an operative response to malicious programs (especially new ones), automatic detection of malicious programs are the main focus of attention. For the effective operation of such software, one often uses elements of artificial intelligence and various methods of machine teaching of models for the detection of malicious programs (i.e., a set of rules for decision making as to the harmfulness of a file on the basis of a certain set of input data describing the malicious file), enabling an effective detection of not only well-known malicious programs or malicious programs with well-known malicious behavior, but also new malicious programs having unknown or little studied malicious behavior, as well as an operative adaptation (learning) to detect new malicious programs.

Although the above-described technologies deal well with the detecting of malicious files having certain characteristic attributes (i.e., data describing certain features of files from a certain group of files, such as the presence of a graphic interface, data encryption, data transmission through a computer network, and so on), the actual method of detection used might make ineffective use of the available computing resources of the computing device on which that detection of malicious files is being done (for example, there might be excessive use of RAM memory or reservation of central processor time). Thus, in the event that computing resources are being used intensively by other applications, the detection of malicious files might become ineffective, and mistakes of the first and second kind may occur (false alarms on safe files and overlooking of malicious files). This is because there might not be enough available computing resources for one task of detecting malicious files, because some of them have been assigned previously to another task of detecting malicious files (for example, more computing resources have been allocated to signature analysis and fewer to heuristic analysis), so that the effectiveness of the search for and detection of malicious files is significantly reduced.

The present disclosure makes it possible to solve the problem of detecting malicious files.

SUMMARY

The disclosure is designed for an antivirus scanning of files. One technical result of the present disclosure is the detecting of malicious files with the use of a trained model for detection of malicious files. Yet another technical result of the present disclosure is the management of the computing resources of a computing device dependent on the calculated degree of harmfulness of an application. Yet another technical result of the present disclosure is the allocation of computer resources for the detection of malicious files.

In one aspect, a system is provided for allocating computer resources for detection of malicious files, the system comprising a hardware processor configured to: form at least one behavior pattern grouping selected commands with shared parameters, apply a hash function on the at least one of the formed behavior pattern to obtain computed parameters, calculate a degree of harmfulness based on the obtained computed parameters using the hash function and a model for detection of malicious files, wherein the degree of harmfulness is a number value characterizing a probability that a malicious activity will be manifested by a time of computing said degree of harmfulness, and wherein the model for detection is a machine learning model previously trained using computed parameters of previous behavior patterns on which the hash function was applied to output degrees of harmfulness, and allocate the computing resources used to ensure a security of a computing device based on the calculated degree of harmfulness.

In one aspect, the allocating of the computing resources comprises allocating additional resources for detection of malicious files when the degree of harmfulness is greater than a predetermined threshold value.

In one aspect, the allocating of the computing resources comprises freeing up resources previously allocated for detection of malicious files when the degree of harmfulness is less than a predetermined threshold value.

In one aspect, the commands are selected from a behavior log that includes a totality of executable commands from the file.

In one aspect, the commands and parameters are selected from the a behavior log based on rules which include at least one of selecting: every i-th command in succession and the parameters describing the selected command, wherein an increment i is specified in advance, the commands executed after a predetermined period of time from a previous selected command, and the parameters describing the selected command, the commands and the parameters describing the commands that are executed in a predetermined time interval from a start of execution of the file, the commands from a predetermined list and the parameters describing the commands, the parameters from a predetermined list and the commands described by the selected parameters, and when the number of command parameters is greater than a predetermined threshold value, the first or a random k parameters of commands.

In one aspect, the model for detection is retrained periodically.

In one aspect, the hash function is a function having an inverse function.

In one aspect, a method is provided for allocating computer resources for detection of malicious files, the method comprising forming at least one behavior pattern grouping selected commands with shared parameters, applying a hash function on the at least one of the formed behavior pattern to obtain computed parameters, calculating a degree of harmfulness based on the obtained computed parameters using the hash function and a model for detection of malicious files, wherein the degree of harmfulness is a number value characterizing a probability that a malicious activity will be manifested by a time of computing said degree of harmfulness, and wherein the model for detection is a machine learning model previously trained using computed parameters of previous behavior patterns on which the hash function was applied to output degrees of harmfulness, and allocating the computing resources used to ensure a security of a computing device based on the calculated degree of harmfulness.

In one aspect, a non-transitory computer-readable medium storing thereon instructions for allocating computer resources for detection of malicious files, the instructions comprising instructions for forming at least one behavior pattern grouping selected commands with shared parameters, applying a hash function on the at least one of the formed behavior pattern to obtain computed parameters, calculating a degree of harmfulness based on the obtained computed parameters using the hash function and a model for detection of malicious files, wherein the degree of harmfulness is a number value characterizing a probability that a malicious activity will be manifested by a time of computing said degree of harmfulness, and wherein the model for detection is a machine learning model previously trained using computed parameters of previous behavior patterns on which the hash function was applied to output degrees of harmfulness, and allocating the computing resources used to ensure a security of a computing device based on the calculated degree of harmfulness.

The above simplified summary of example aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the detailed description that follows. To the accomplishment of the foregoing, the one or more aspects of the disclosure include the features described and particularly pointed out in the claims.

BRIEF DESCRIPTION OF THE DRAWINGS

The accompanying drawings, which are incorporated into and constitute a part of this specification, illustrate one or more example aspects of the disclosure and, together with the detailed description, serve to explain their principles and implementations.

DETAILED DESCRIPTION

Exemplary aspects are described herein in the context of a system, method and computer program product for allocating computer resources for detection of malicious files. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The following terms will be used throughout the disclosure, drawings and claims.

Malicious file—a file whose execution is known to be able to result in unauthorized destruction, blocking, modification, copying of computer information or neutralization of the protection of computer information module.

Malicious behavior of an executable file—a group of actions which may be performed during execution of that file and which are known to be able to result in unauthorized destruction, blocking, modification, copying of information or neutralization of the protection of computer information module.

Malicious activity of an executable file—a group of actions performed by that file in accordance with its malicious behavior.

Computing device of the average user—a hypothetical (theoretical) computing device having averaged characteristics of the computing devices of a previously selected group of users on which the same applications are executed as on the computing devices of those users.

Command executable by a computing device—a set of machine instructions or instructions of scripts executable by a computing device on the basis of the parameters of those instructions, known as command parameters or parameters describing said command.

Lexical analysis (tokenizing)—a process of analytical parsing of an input sequence of characters into recognized groups (hereafter: lexemes), in order to form at the output identification sequences (hereafter: tokens).

Token—an identification sequence formed from a lexeme in the process of lexical analysis.

Figure 1:
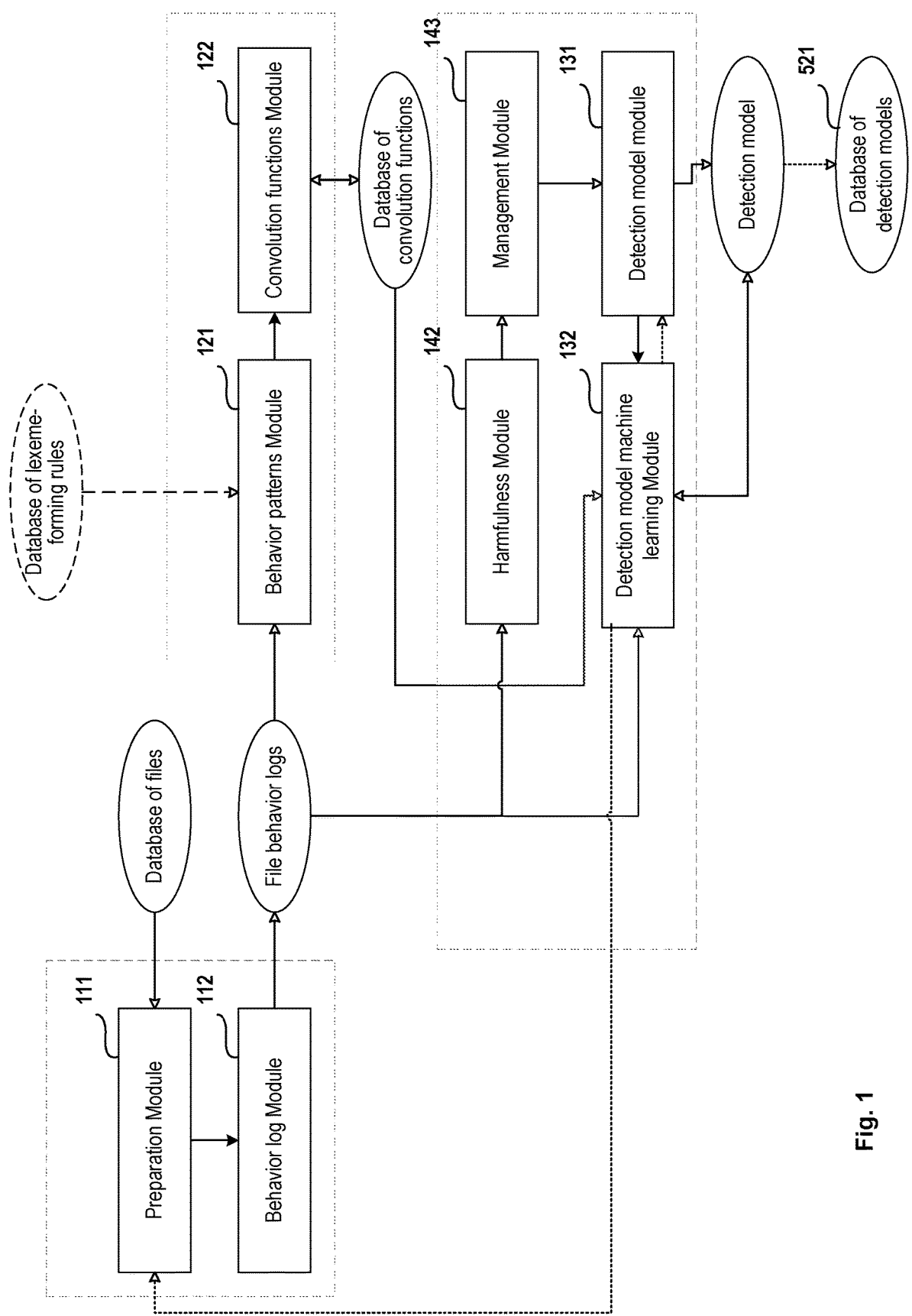
FIG. 1 shows the structural diagram of a system of machine learning of a model for detection of malicious files.

FIG. 1 shows the structural diagram of the system of machine learning of a model for detection of malicious files.

The structural diagram of the system of machine learning consists of a preparation module 111, the behavior log module 112, a behavior patterns module 121, a convolution functions module 122, a detection model module 131, a detection model machine learning module 132, the harmfulness module 142, and a management module 143.

In one exemplary aspect, the mentioned system of machine learning of a detection model has a client-server architecture, in which the preparation module 111, the behavior log module 112, the behavior patterns module 121, the convolution functions module 122, the detection model module 131, and the detection model machine learning module 132 work at the server side, and the behavior patterns module 121, the harmfulness module 142 and the management module 143 work on the client side.

For example, the client may be the computing devices of a user, such as a personal computer, notebook, smartphone, and so forth, and the server may be the computing devices of an antivirus company, such as distributed systems of servers by means of which, besides everything else, a preliminary collection and antivirus analysis of files, a creation of antivirus records, and so forth, is done, wherein the system of machine learning of a model for detection of malicious files will be used to detect malicious files at the client side, thereby enhancing the effectiveness of the antivirus protection of that client.

In yet another example, both the client and the server may be the computing devices of the antivirus company alone, wherein the system of machine learning of a model for detection of malicious files will be used for an automated antivirus analysis of files and creation of antivirus records, thereby enhancing the working effectiveness of the antivirus company.

The preparation module 111 is designed to:
select at least one file from a database of files in accordance with predetermined rules of forming a learning selection of files, after which the detection model machine learning module 132 will carry out the teaching of the model of detection on the basis of an analysis of the selected files;
send the selected files to the behavior log module 112.

In one exemplary aspect, at least one safe file and one malicious file are kept in the database of files.

For example, the database of files may keep, as safe files, the files of the operating system Windows, and as malicious files the files of backdoors, applications carrying out unauthorized access to data and remote control of an operating system and a computer as a whole. By training with the mentioned files and using methods of machine learning, the model for detection of malicious files will be able to detect malicious files having a functionality similar to the functionality of the aforementioned backdoors with high accuracy (the higher the accuracy the more files are used for the teaching of the aforementioned model of detection).

In yet another exemplary aspect, the database of files additionally keeps at least:
suspicious files (riskware)—files which are not malicious, yet are able to carry out malicious actions;
unknown files—files whose harmfulness has not been determined and remains unknown (i.e., files which are not safe, malicious, suspicious, and so forth).

For example, the database of files may have, as suspicious files, the application files of remote administration (such as RAdmin), archiving, or data encryption (such as WinZip), and so on.

In yet another exemplary aspect, the database of files keeps at least files:
collected by antivirus web crawlers;
sent in by users.

The mentioned files are analyzed by antivirus experts, including with the help of a file analysis module, in order to then pronounce a verdict as to the harmfulness of such files.

For example, the database of files may keep files sent in by users from their computing devices to the antivirus companies for a checking of their harmfulness, in which case the files transmitted may be either safe or malicious, and the distribution between the number of said safe and malicious files is close to the distribution between the number of all safe and malicious files located on the computing devices of said users (i.e., the ratio of the number of said safe files to the number of said malicious files differs from the ratio of the number of all safe files to the number of all malicious files located on the computing devices of said users by a quantity less than a specified threshold value)

$$\left| \frac{N_{clean}}{N_{malware}} - \frac{\forall N_{clean}}{\forall N_{malware}} \right| < \varepsilon$$

Unlike the files transmitted by the users (i.e., files which are subjectively suspicious), the files collected by antivirus web crawlers which are designed to search for suspicious and malicious files more often prove to be malicious.

In yet another exemplary aspect, at least one of the conditions is used as the criteria for selecting files from the database of files:
  the distribution between safe and malicious files selected from the database of files corresponds to the distribution between safe and malicious files located on the computing device of the average user;
  the distribution between safe and malicious files selected from the database of files corresponds to the distribution between safe and malicious files collected with the help of antivirus web crawlers;
  the parameters of the files selected from the database of files correspond to the parameters of the files located on the computing device of the average user;
  the number of selected files corresponds to a predetermined value, while the files themselves are selected at random.

For example, the database of files contains 100000 files, among which 40% are safe files and 60% are malicious files. From the database of files there are selected 15000 files (15% of the total number of files being kept in the database of files) such that the distribution between the selected safe and malicious files corresponds to the distribution between the safe and the malicious files located on the computing device of the average user and amounts to 95 to 5. For this purpose, 14250 safe files (35.63% of the total number of safe files) and 750 malicious files (1.25% of the total number of malicious files) are chosen at random from the database of files.

In yet another example, the database of files contains 1250000 files, of which 95% are safe files and 5% are malicious files, i.e., the distribution between the safe and malicious files being kept in the database of files corresponds to the distribution between the safe and the malicious files located on the computing device of the average user. Of these files, 5000 files are chosen at random, of which ~4750 prove to be safe files and ~250 malicious files with a high probability.

In yet another exemplary aspect, the file parameters are at least:
  the harmfulness of the file, characterizing whether the file is safe, malicious, potentially dangerous, or the behavior of the computing system when executing the file is not determined, and so forth;
  the number of commands performed by the computing device during the execution of the file;
  the size of the file;
  the applications utilizing the file.

For example, malicious files are chosen from the database of files which are scripts in the "ActionScript" language, executable by the application "Adobe Flash", and not exceeding 5 kb in size.

In yet another exemplary aspect, the preparation module 111 is additionally designed to:
  select at least one other file from the database of files in accordance with predetermined rules of forming a test selection of files, after which the detection model machine learning module 132 will carry out a verification of the trained model of detection on the basis of an analysis of the selected files;
  send the selected files to the behavior log module 112.

For example, the database of files contains 75000 files, among which 20% are safe files and 80% are malicious files. First of all, 12500 files are chosen from the database of files, of which 30% are safe files and 70% are malicious files, after which the detection model machine learning module 132 will perform a teaching of the model of detection on the basis of an analysis of the selected files, and then select 2500 files from the remaining 62500 files, of which 60% are safe files and 40% are malicious files, and after this the detection model machine learning module 132 will perform a checking of the trained model of detection on the basis of an analysis of the selected files. The data formulated in the above-described way is called the cross-validation set of data.

The behavior log module 112 is designed to:
  intercept at least one executable command at least during:
    the execution of the file received,
    the emulation of the execution of the file received, wherein the emulation of the execution of the file includes the opening of the mentioned file (for example, the opening of a script by an interpreter);
  determine for each intercepted command at least one parameter describing said command;
  form the behavior log of the obtained file on the basis of the intercepted commands and the parameters so determined, wherein the behavior log constitutes the totality of intercepted commands (hereinafter, the command) from the file, where each command corresponds at least to one parameter so determined and describing that command (hereinafter, the parameter).

For example, the commands intercepted during the execution of a malicious file which collects passwords and transmits them via a computer network and the parameters calculated for said commands may look like:
  CreateFile, 'c:\windows\system32\data.pass'
  ReadFile, 0x14ea25f7, 0xf000
  connect, http://stealpass.com
  send, 0x14ea25f7, 0xf000

In one exemplary aspect, the intercepting of commands from the file is done with the aid of at least:
  a specialized driver;
  a debugger;
  a hypervisor.

For example, the intercepting of commands during the execution of the file and the determination of their parameters are done with the aid of a driver which utilizes an interception by splicing of the entry point of a WinAPI function.

In yet another example, the intercepting of commands during the emulation of the working of a file is done directly by an emulator performing said emulation, which determines the parameters of the command needing to be emulated.

In yet another example, the intercepting of commands during the execution of the file on a virtual machine is done by a hypervisor, which determines the parameters of the command needing to be emulated.

In yet another exemplary aspect, the intercepted commands from the file are at least:
API functions;
sets of machine instructions describing a predetermined set of actions (macro commands).

For example, malicious programs very often perform a search for certain files and modify their attributes, for which they employ a sequence of commands such as:
FindFirstFile, 'c:\windows\system32\*.pass', 0x40afb86a
SetFileAttributes, 'c:\windows\system32\data.pass'
FindNextFile, 0x40afb86a
CloseHandle, 0x40afb86a
which may in turn be described by only a single command
_change_attributes, 'c:\windows\system32\*.pass'

In yet another exemplary aspect, each command is matched up with its unique identifier.

For example, all WinAPI functions may be matched up with numbers in the range of 0x0000 to 0x8000, where each WinAPI function corresponds to a unique number (for example, ReadFile→0x00f0, ReadFileEx→0x00f1, connect→0x03A2).

In yet another exemplary aspect, several commands describing similar actions are matched up with a single identifier.

For example, all commands such as ReadFile, ReadFileEx, ifstream, getline, getchar and so forth, which describe a reading of data from a file, are matched up with an identifier _read_data_file (0x70F0).

The behavior patterns module 121 is designed to:
form at least one behavior pattern on the basis of the commands and parameters selected from the behavior log, wherein the behavior log constitutes the totality of executable commands (hereinafter, the command) from the file, where each command corresponds at least to one parameter describing that command (hereinafter, the parameter), the behavior pattern being a set of at least one command and a parameter which describes all of the commands of that set (hereinafter, the elements of the behavior pattern);
send the behavior patterns so formed to the convolution functions module 122.

For example, from the behavior log the following commands $c_i$ and parameters $p_i$ are selected:
$\{c_1, p_1, p_2, p_3\}$.
$\{c_2, p_1, p_4\}$.
$\{c_3, p_5\}$,
$\{c_2, p_5\}$.
$\{c_1, p_5, p_6\}$.
$\{c_3, p_2\}$.

On the basis of the selected commands and parameters, behavior patterns are formed containing one command each and one parameter describing that command:
$\{c_1, p_1\}$, $\{c_1, p_2\}$, $\{c_1, p_3\}$, $\{c_1, p_5\}$, $\{c_1, p_6\}$,
$\{c_2, p_1\}$, $\{c_2, p_4\}$, $\{c_2, p_5\}$,
$\{c_3, p_2\}$, $\{c_3, p_5\}$.

Next, on the basis of the patterns so formed, additional behavior patterns are formed, containing one parameter each and all the commands which can be described by that parameter:
$\{c_1, c_2, p_1\}$.
$\{c_1, c_3, p_2\}$.
$\{c_1, c_2, c_3, p_5\}$.

After this, on the basis of the patterns so formed, additional behavior patterns are formed, containing several parameters each and all the commands which can be described by those parameters at the same time:
$\{c_1, c_2, p_1, p_5\}$.

In one exemplary aspect, the commands and parameters are chosen from the behavior log on the basis of rules by which are selected at least:
every i-th command in succession and the parameters describing it, the increment i being specified in advance;
the commands executed after a predetermined period of time (for example, every tenth second) from the previous selected command, and the parameters describing them;
the commands and the parameters describing them that are executed in a predetermined time interval from the start of execution of the file;
the commands from a predetermined list and the parameters describing them;
the parameters from a predetermined list and the commands described by those parameters;
the first or the random k parameters of commands in the case when the number of command parameters is greater than a predetermined threshold value.

For example, from the behavior log one selects all the commands for working with a hard disk (such as CreateFile, ReadFile, WriteFile, DeleteFile, GetFileAttribute and so on) and all the parameters describing the selected commands.

In yet another example, from the behavior log one selects every thousandth command and all the parameters describing the selected commands.

In one exemplary aspect, the behavior logs are formed in advance from at least two files, one of which is a safe file and the other a malicious file.

In yet another exemplary aspect, each element of the behavior pattern is matched up with a characteristic such as the type of element of the behavior pattern. The type of element of the behavior pattern (command or parameter) is at least:
a "number range", if the element of the behavior pattern can be expressed as a number,
for example, for an element of the behavior pattern constituting the parameter $port_{html}=80$ of the connect command, the type of said element of the behavior pattern may be the "number range from 0x0000 to 0xFFFF",
a "string", if the element of the behavior pattern can be expressed in the form of a string,
for example, for an element of the behavior pattern constituting the connect command, the type of said element of the behavior pattern may be a "string less than 32 characters in size",
if the element of the behavior pattern can be expressed in the form of data described by a predetermined data structure, the type of that element of the behavior pattern may be a "data structure",
for example, for an element of a behavior pattern constituting the parameter src=0x336b9a480d490982cdd93e2e49fdeca7 of the find record command, the type of this element of the behavior pattern may be the "data structure MD5".

In yet another exemplary aspect, the behavior pattern additionally includes, as elements of the behavior pattern, tokens formed on the basis of lexical analysis of said elements of the behavior pattern with the use of at least:
predetermined rules for the formation of lexemes,
a previously trained recurrent neural network.

For example, with the aid of lexical analysis of the parameter
'c:\windows\system32\data.pass'
on the basis of the rules for the formation of lexemes:
if the string contains the path to a file, determine the disk on which the file is located;
if the string contains the path to a file, determine the folders in which the file is located;
if the string contains the path to a file, determine the file extension;
where the lexemes are:
the paths to the file;
the folders in which the files are located;
the names of the files;
the extensions of the files;
the tokens can be formed:
"paths to the file"→
'c:\',
"folders in which the files are located"→
'windows',
'system32',
'windows\system32',
"extensions of the files"→
'.pass'.

In yet another example, with the aid of lexical analysis of the parameters
'81.19.82.8', '81.19.72.38', '81.19.14.32'
on the basis of the rule for the formation of lexemes:
if the parameters constitute IP addresses, determine the bit mask (or its analog, expressed by metacharacters) describing said IP addresses (i.e., the bit mask M for which the equality M∧IP=const is true for all said IPs);
the token can be formulated:
'81.19.*.*'.

In yet another example, from all available parameters comprising numbers, the tokens of the numbers are formed in predetermined ranges:
23, 16, 7224, 6125152186, 512, 2662162, 363627632, 737382, 52, 2625, 3732, 812, 3671, 80, 3200
and sorting is done by ranges of numbers:
from 0 to 999
→{16, 23, 52, 80, 512, 812},
from 1000 to 9999
→{2625, 3200, 3671, 7224},
from 10000
{737382, 2662162, 363627632, 6125152186}

In yet another exemplary aspect, tokens are formed from elements of a behavior pattern which consist of strings.

For example, the behavior pattern is a path to a file containing the names of the disk, the directory, the file, the file extension, and so forth. In this case, the token may be the name of the disk and the file extension.
C:\Windows\System32\drivers\acpi.sys
→
C:\
*.sys The convolution functions module 122 is designed to:
form a convolution function from the behavior pattern such that the inverse convolution function of the result of that convolution function on the obtained behavior pattern will have a degree of similarity with the obtained behavior pattern greater than a specified value, i.e.

$$r \sim g^{-1}(g(r))$$

where:
$r_i$ is the behavior pattern,
g is the convolution function,
$g^{-1}$ is the inverse convolution function;
send the convolution function so formed to the detection model machine learning module 132.

In one exemplary aspect, the convolution functions module 122 is additionally designed to:
calculate the feature vector of a behavior pattern on the basis of the obtained behavior pattern, wherein the feature vector of the behavior pattern may be expressed as the sum of the hash sums of the elements of the behavior pattern;
form a convolution function from the feature vector of the behavior pattern, where the convolution function constitutes a hash function such that the degree of similarity between the calculated feature vector and the result of the inverse hash function of the result of that hash function of the calculated feature vector is greater than a predetermined value.

In yet another exemplary aspect, the convolution function is formed by the metric learning method, i.e., such that the distance between the convolutions obtained with the aid of said convolution function for behavior patterns having a degree of similarity greater than a predetermined threshold value is less than a predetermined threshold value, while for behavior patterns having a degree of similarity less than the predetermined threshold value it is greater than the predetermined threshold value.

For example, the feature vector of the behavior pattern may be calculated as follows:
first an empty bit vector is created, consisting of 100000 elements (where one bit of information is reserved for each element of the vector);
1000 elements from the behavior pattern r are set aside for storing of data about the commands $c_i$, the remaining 99000 elements being set aside for the parameters $c_i$ of the behavior pattern r, wherein 50000 elements (from element 1001 to element 51000) are set aside for string parameters and 25000 elements (from element 51001 to element 76000) for number parameters;
each command $c_i$ of the behavior pattern r is matched up with a certain number $x_i$ from 0 to 999, and the corresponding bit is set in the vector so created $$v[x_i]=true;$$

for each parameter $p_i$ of the behavior pattern r the hash sum is calculated by the formula:

for strings: $y_i=1001+crc32(p_i)(\mod 50000)$ for numbers: $y_i=51001+crc32(p_i)(\mod 25000)$ for others: $y_i=76001+crc32(p_i)(\mod 24000)$ and depending on the calculated hash sum the corresponding bit is set in the created vector $$v[y_j]=true.$$

The described bit vector with the elements so set constitutes the feature vector of the behavior pattern r.

In yet another exemplary aspect, the feature vector of the behavior pattern is computed by the following formula:

$$D = \sum_i b^i \times h(r_i)$$

where:
b is the base of the positional system of computation (for example, for a binary vector b=2, for a vector representing a string, i.e., a group of characters, b=8),
$r_i$ is the i-th element of the behavior pattern,
h is the hash function, where $0 \leq h(r_i) < b$.

For example, the feature vector of the behavior pattern may be computed as follows:
first create yet another empty bit vector (different from the previous example), consisting of 1000 elements (where one bit of information is reserved for each element of the vector);
calculate the hash sum for each pattern element $r_i$ of the behavior pattern r by the formula:

$$x_i = 2^{crc32(r_i)(mod\ 1000)}$$

and depending on the computed hash sum, set the corresponding bit in the created vector $$v[x_i] = true.$$

In yet another exemplary aspect, the feature vector of the behavior pattern constitutes a Bloom filter.

For example, the feature vector of the behavior pattern may be computed as follows:
first create yet another empty vector (different from the previous examples), consisting of 100000 elements;
calculate at least two hash sums for each pattern element $r_i$ of the behavior pattern r by a set of hash functions $\{h_j\}$ by the formula:

$$x_{ij} = h_j(r_i)$$

where:

$$h_j(r_i) = crc32(r_i),$$

$$h_j(0) = const_j$$

and depending on the computed hash sums, set the corresponding elements in the created vector $$v[x_{ij}] = true.$$

In yet another exemplary aspect, the size of the result of the formulated convolution function of the feature vector of the behavior pattern is less than the size of said feature vector of the behavior pattern.

For example, the feature vector constitutes a bit vector containing 100000 elements, and thus having a size of 12500 bytes, while the result of the convolution function of said feature vector constitutes a set of 8 MD5 hash sums and thus has a size of 256 bytes, i.e., ~2% of the size of the feature vector.

In yet another exemplary aspect, the degree of similarity between the feature vector and the result of the inverse hash function of the result of said hash function of the calculated feature vector constitutes a number value in the range of 0 to 1 and is calculated by the formula:

$$w = \frac{\sum (\{h(r_i)\} \wedge \{g_i\})}{\sum \{h(r_i)\}}$$

$$\{h(r_i)\} \wedge \{g_i\} \vee \{h(r_i)\} = \{g_i\}$$

where:
$h(r_i) \wedge g_i$ signifies the concurrence of $h(r_i)$ with $g_i$ "
$\{h(r_i)\}$ is the set of results of the hash functions of the elements of the behavior pattern,
$\{g_i\}$ is the set of results of the inverse hash function of the result of the hash function of the elements of the behavior pattern,
$r_i$ is the i-th element of the behavior pattern,
h is the hash function,
w is the degree of similarity.

For example, the calculated feature vector constitutes the bit vector:
"101011100110010010110111011111101000100011001001001001110101 10110 011001101101001000100000010111011100110110 11," the result of the convolution function of this feature vector is:
"1010011110101110101", and the result of the inverse convolution function of the above-obtained result is:
"101011100<u>1</u>000100101101110
01111101000<u>1</u>0001100100101<u>0</u>10001110101101101<u>1</u>100
0110011011010<u>0</u>0000100000010111011100110110<u>1</u>1",
(where the bolding/underlining denotes elements different from the feature vector). Thus, the similarity of the feature vector and the result of the inverse convolution function is 0.92.

In yet another exemplary aspect, the aforementioned hash function using an element of the behavior pattern as a parameter depends on the type of element of the behavior pattern:

$$h(r_i) = h_{r_i}(r_i).$$

For example, in order to compute the hash sum of a parameter from the behavior pattern constituting a string containing the path to the file, we use the hash function CRC32; for any other string—the Huffman algorithm; for a data set, the hash function MD5.

In yet another exemplary aspect, the forming of the convolution function of the feature vector of a behavior pattern is done by an autoencoder, where the input data are the elements of that feature vector of the behavior pattern, and the output data are data having a coefficient of similarity to the input data greater than a predetermined threshold value.

The detection model module 131 is designed to:
create a model for detection of malicious files, including at least:
selection of a method of machine learning of the detection model;
initialization of the parameters of the teaching model, where the parameters of the teaching model initialized prior to the start of the machine learning of the detection model are known as hyperparameters, where the hyperparameters are dependent on the parameters of the files selected by the preparation module 111;
send the teaching model so created to the detection model machine learning module 132.

For example, when selecting the method of machine learning of the detection model, at first a decision is made whether to use as the detection model an artificial neural net or a random forest, and then if the random forest is chosen, one selects the separating criterion for the nodes of the random forest; or if an artificial neural net is chosen, one selects the method of numerical optimization of the parameters of the artificial neural net. The decision as to the choice of a particular method of machine learning is made on the basis of the effectiveness of that method in the detecting of malicious files (i.e., the number of errors of the first and second kind occurring in the detecting of malicious files) with the use of input data (behavior patterns) of predetermined kind (i.e., the data structure, the number of elements of the behavior patterns, the performance of the computing device on which the search is conducted for malicious files, the available resources of the computing device, and so on).

In yet another example, the method of machine learning of the detection model is selected on the basis of at least:
cross testing, sliding check, cross-validation (CV);
mathematical validation of the criteria AIC, BIC and so on;
A/B testing, split testing;
stacking.

In yet another example, in the event of low performance of the computing device, the random forest is chosen, otherwise the artificial neural net is chosen.

In one exemplary aspect, machine learning is performed for a previously created untrained detection model (i.e., a detection model in which the parameters of that model cannot produce, on the basis of analysis of the input data, output data with accuracy higher than a predetermined threshold value).

In yet another exemplary aspect, the method of machine learning of the detection model is at least:
decision-tree-based gradient boosting;
decision trees;
the K-nearest neighbor method;
the support vector machine (SVM).

In yet another exemplary aspect, the detection model module 131 is additionally designed to create a detection model on demand from the detection model machine learning module 132, where certain hyperparameters and methods of machine learning are chosen to be different from the hyperparameters and methods of machine learning chosen for a previous detection model.

The detection model machine learning module 132 is designed to teach the detection model, in which the parameters of the detection model are computed with the use of the obtained convolution function on the obtained behavior patterns, where the detection model constitutes a set of rules for computing the degree of harmfulness of a file on the basis of at least one behavior pattern with the use of the computed parameters of said detection model.

For example, the detection model is trained with a known set of files selected by the preparation module 111, wherein said set of files contains 60% safe files and 40% malicious files.

In one exemplary aspect, the degree of harmfulness of a file constitutes a numerical value from 0 to 1, where 0 means that said file is safe, and 1 that it is malicious.

In yet another exemplary aspect, a method of teaching of the detection model is chosen which ensures a monotonic change in the degree of harmfulness of a file dependent on the change in the number of behavior patterns formed on the basis of analysis of the behavior log.

For example, a monotonic change in the degree of harmfulness of a file means that, upon analyzing each subsequent behavior pattern, the calculated degree of harmfulness will be not less than the previously calculated degree of harmfulness (for example, after analysis of the 10th behavior pattern, the calculated degree of harmfulness is equal to 0.2; after analysis of the 50th behavior pattern, it is 0.4; and after analysis of the 100th behavior pattern, it is 0.7).

In yet another exemplary aspect, the detection model machine learning module 132 is additionally designed to:
perform a check of the trained detection model on the obtained behavior logs formed on the basis of analysis of files from a test selection of files, in order to determine the correct determination of the harmfulness of files from the test selection of files;
in the event of a negative result of the check, send a request at least:
to the preparation module 111 to prepare a selection of files different from the current one used for the teaching of the detection model;
to the detection model module 131 to create a new detection model, different from the current one.

The checking of the trained detection model involves the following. Said detection model has been taught on the basis of a set of files selected by the preparation module 111 for which it was known whether they are safe or malicious. In order to verify that the model for detection of malicious files has been trained correctly, i.e., that detection model is able to detect malicious files and pass over safe files, a checking of this model is performed. For this purpose, said detection model is used to determine whether files from another set of files selected by the preparation module 111 are malicious, it being known in advance whether those files are malicious. Thus, one determines how many malicious files were "missed" and how many safe files were detected. If the number of missed malicious files and detected safe files is greater than a predetermined threshold value, that detection model is considered to be improperly trained and a repeat machine learning needs to be done for it (for example, on another training selection of files, using values of the parameters of the detection model different from the previous ones, and so forth).

For example, when performing the check for the trained model one checks the number of errors of the first and second kind in the detecting of malicious files from a test selection of files. If the number of such errors is greater than a predetermined threshold value, a new teaching and testing selection of files is selected and a new detection model is created.

In yet another example, the teaching selection of files contained 10000 files, of which 8500 were malicious and 1500 were safe. After the detection model was taught, it was checked on a test selection of files containing 1200 files, of which 350 were malicious and 850 were safe. According to the results of the check performed, 15 out of 350 malicious files failed detection (4%), while 102 out of 850 safe files (12%) were erroneously considered to be malicious. In the event that the number of undetected malicious files exceeds 5% or randomly detected safe files exceeds 0.1%, the trained detection model is considered to be improperly trained.

In one exemplary aspect, the behavior log of the system is additionally formed on the basis of a previously formed behavior log of the system and commands intercepted after the forming of said behavior log of the system.

For example, after the start of the execution of a file for which the verdict is being pronounced as to the harmfulness or safety of that file, the intercepted executable commands and the parameters describing them are recorded in the behavior log. On the basis of an analysis of these commands and parameters, a degree of harmfulness of that file is calculated. If no verdict was pronounced as to the file being malicious or safe based on the results of the analysis, the intercepting of commands may be continued. The intercepted commands and the parameters describing them are recorded in the old behavior log or in a new behavior log. In the first case, the degree of harmfulness is calculated on the basis of an analysis of all commands and parameters recorded in the behavior log, i.e., even those previously used to calculate the degree of harmfulness.

The harmfulness module 142 is designed to:
calculate the degree of harmfulness on the basis of the behavior log obtained from the behavior log module 112 and the detection model obtained from the detection model machine learning module 132, the degree of harmfulness of a file being a quantitative characteristic (for example, lying in the range from 0—the file has only safe behavior—to 1—said file has predetermined malicious behavior), describing the malicious behavior of the executable file;
send the calculated degree of harmfulness to the management module 143.

The management module 143 is designed to allocate computing resources of the computer system on the basis of the analysis of the obtained degree of harmfulness for use in assuring the security of the computer system.

In one exemplary aspect, the computing resources of the computer system include at least:
the volume of free RAM;
the volume of free space on the hard disks;
the free processor time (quanta of processor time) which can be spent on the antivirus scan (for example, with a greater depth of emulation).

In yet another exemplary aspect, the analysis of the degree of harmfulness consists in determining the dynamics of the change in the value of the degree of harmfulness after each of the preceding calculations of the degree of harmfulness and at least:
allocating additional resources of the computer system in the event of an increase in the value of the degree of harmfulness;
freeing up previously allocated resources of the computer system in the event of a decrease in the value of the degree of harmfulness.

Figure 2:
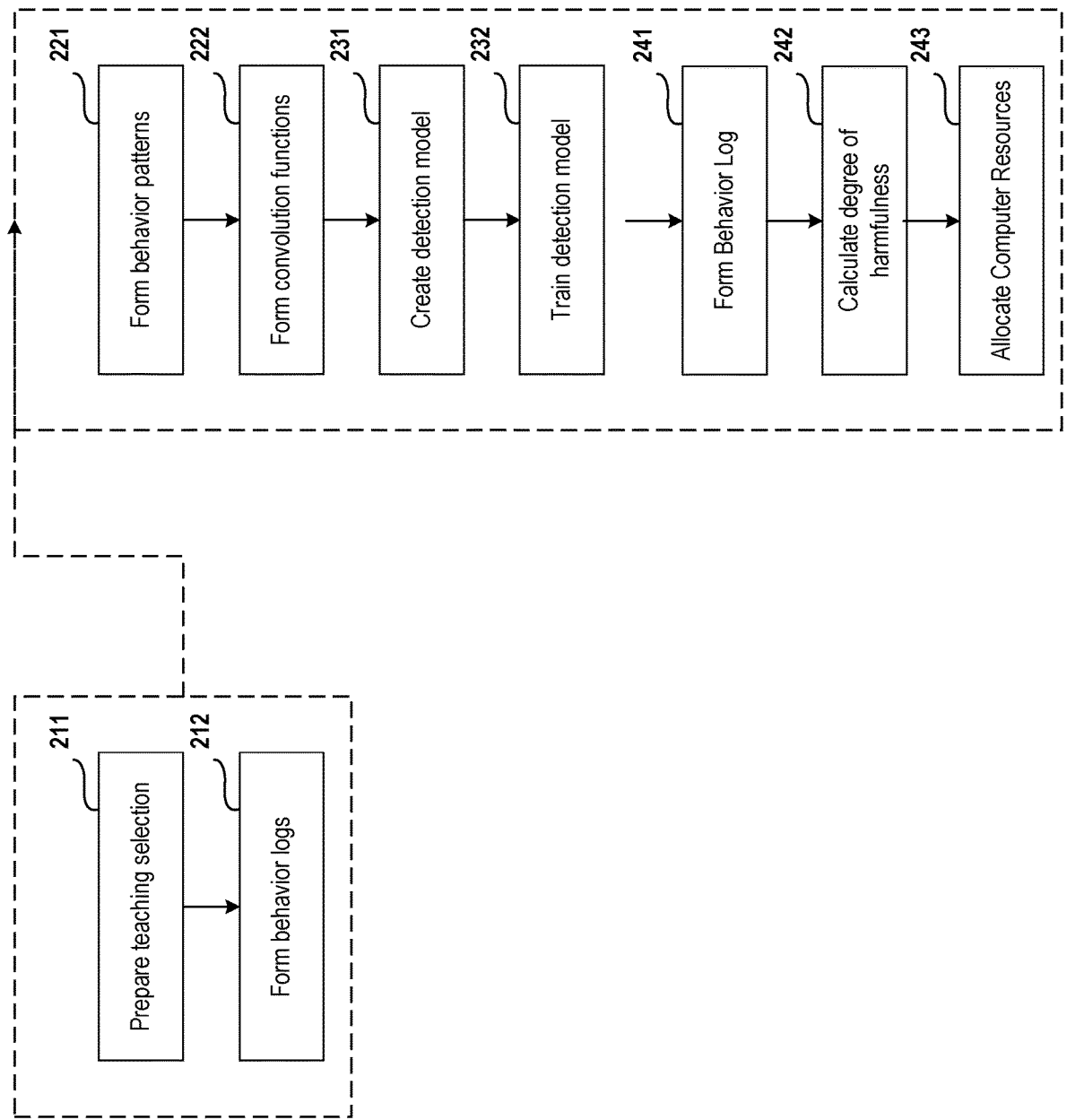
FIG. 2 shows the structural diagram of the method of machine learning of a model for detection of malicious files.

FIG. 2 shows the structural diagram of the method of machine learning of a model for detection of malicious files.

The structural diagram of the method of machine learning of a model for detection of malicious files contains a step 211 in which teaching selections of files are prepared, a step 212 in which behavior logs are formed, a step 221 in which behavior patterns are formed, a step 222 in which convolution functions are formed, a step 231 in which a detection model is created, a step 232 in which the detection model is trained, a step 241 in which the behavior of the computer system is tracked, a step 242 in which the degree of harmfulness is calculated, and a step 243 in which the resources of the computer system are managed.

In step 211, the preparation module 111 is used to select at least one file from a database of files according to predetermined criteria, wherein the teaching of the detection model will be done in step 232 on the basis of the selected files.

In step 212, the behavior log module 112 is used:
to intercept at least one command at least during:
the execution of the file selected in step 211,
the emulation of the working of the file selected in step 211;
to determine for each intercepted command at least one parameter describing that command;
to form, on the basis of the commands intercepted and the parameters determined, a behavior log of the obtained file, wherein the behavior log represents a set of intercepted commands (hereinafter, the command) from the file, where each command corresponds to at least one defined parameter describing that command (hereinafter, the parameter).

In step 221, the behavior patterns module 121 is used to form at least one behavior pattern on the basis of the commands and parameters selected from the behavior log formed in step 212, where the behavior log represents the group of executable commands (hereinafter, the command) from the file, where each command corresponds to at least one parameter describing that command (hereinafter, the parameter), the behavior pattern being a set of at least one command and a parameter which describes all the commands from that set.

In step 222, the convolution functions module 122 is used to form a convolution function of the behavior pattern formed in step 221 so that the inverse convolution function of the result of this convolution function on the aforementioned behavior pattern will have a degree of similarity to the aforementioned behavior pattern greater than a specified value.

In step 231, the detection model module 131 is used to create a detection model, for which at least:
a method of machine learning of the detection model is selected;
the parameters of the teaching model are initialized, where the parameters of the teaching model initialized prior to the start of the machine learning of the detection model are known as hyperparameters, dependent on the parameters of the files selected in step 211.

In step 232, the detection model machine learning module 132 is used to teach the detection model created in step 231, in which the parameters of that detection model are calculated with the use of the convolution function formed in step 222, on the behavior patterns formed in step 221, where the detection model where the detection model constitutes a group of rules for calculating the degree of harmfulness of a file on the basis of at least one behavior pattern with the use of the calculated parameters of that detection model.

In step 241, the behavior log module 112 is used:
to intercept at least one command being executed by the files running in the computer system;
to form a behavior log of the system on the basis of the intercepted commands.

In step 242, the harmfulness module 142 is used to calculate the degree of harmfulness on the basis of the behavior log of the system, formed in step 241, and the detection model which has been trained in step 232.

In step 243, the management module 143 is used to allocate computing resources on the basis of the analysis of the degree of harmfulness as calculated in step 242, for use in assuring the security of the computer system.

Figure 3:
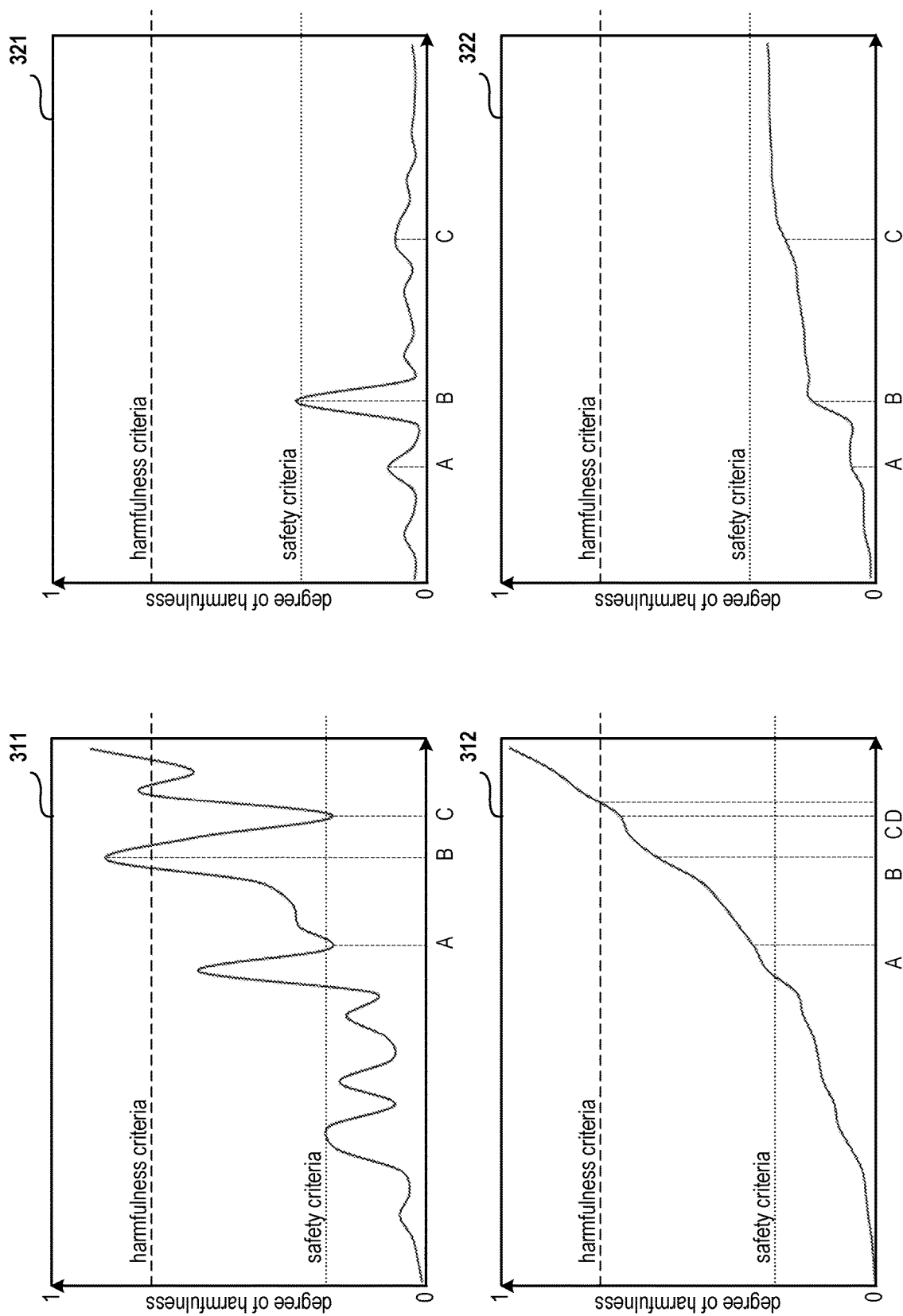
FIG. 3 shows examples of the dynamics of changing the degree of harmfulness as a function of the number of behavior patterns.

FIG. 3 shows examples of the dynamics of changing the degree of harmfulness as a function of the number of behavior patterns.

The examples of the dynamics of changing the degree of harmfulness as a function of the number of behavior patterns contain a graph of the dynamics of an arbitrary change in the degree of harmfulness as a function of the number of behavior patterns formed during the execution of a malicious file 311, a graph of the dynamics of a monotonic change in the degree of harmfulness as a function of the number of behavior patterns formed during the execution of a malicious file 312, a graph of the dynamics of an arbitrary change in the degree of harmfulness as a function of the number of behavior patterns formed during the execution of a safe file 321, and a graph of the dynamics of a monotonic change in the degree of harmfulness as a function of the number of behavior patterns formed during the execution of a safe file 322.

In one exemplary aspect, the degree of harmfulness of an executable file takes on a value in the range of 0 (said file has absolutely safe behavior) to 1 (said file has predetermined malicious behavior).

The graph 311 shows the dynamics of an arbitrary change in the degree of harmfulness as a function of the number of behavior patterns formed during the execution of a malicious file.

In the beginning, upon executing said file, the number of behavior patterns formed is not large, and what is more the malicious activity of the executable file might be absent or minimal (for example, an initialization of data occurs, which is natural to many files, including safe ones), so that the calculated degree of harmfulness differs slightly from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows and the degree of harmfulness begins to approach 1, surpassing the criterion of safety, while the degree of harmfulness might not reach the predetermined threshold value (hereinafter, the criterion of harmfulness), after the passing of which the behavior of the executable file will be considered to be malicious (in the graph, this threshold value is designated by a dashed line).

After a period of growth, the malicious activity may cease and the degree of harmfulness will again tend toward 0 (time A). At a certain time, the degree of harmfulness will become greater than the criterion of harmfulness (time B) and the behavior of the executable file will be recognized as malicious and in consequence the file itself will be recognized as malicious.

The time of recognizing the file as malicious might occur significantly later than the start of growth in malicious activity, since the described approach responds well to an abrupt growth in the degree of harmfulness, which occurs most often during prolonged, clearly manifested malicious activity of the executable file.

In the event that the malicious activity occurs episodically (left side of the graph 311), the calculated degree of harmfulness might not reach the value after which a verdict is pronounced as to the harmfulness of the behavior of the executable file, and consequently the harmfulness of the executable file itself.

In the case when the degree of harmfulness is calculated not on the basis of each behavior pattern formed (for example, because the performance of the computing device is low), a situation is possible where the degree of harmfulness will be calculated at time A (when the malicious activity commences) and time C (when the malicious activity is finished), but will not be calculated at time B (when malicious activity is occurring), so that the calculated degrees of harmfulness will not exceed the criterion of harmfulness, the activity of the executable file will not be recognized as malicious, and consequently the malicious file will not be detected.

The graph 312 shows the dynamics of a monotonic change in the degree of harmfulness as a function of the number of behavior patterns formed during the execution of a malicious file.

In the beginning, upon executing said file, the number of behavior patterns formed is not large, and what is more the malicious activity of the executable file might be absent or minimal (for example, an initialization of data occurs naturally in many files, including safe ones), so that the calculated degree of harmfulness differs slightly from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows and the degree of harmfulness begins to approach 1, surpassing the criterion of safety, while the degree of harmfulness might not reach the predetermined threshold value (hereinafter, the criterion of harmfulness), after the passing of which the behavior of the executable file will be considered to be malicious (in the graph, this threshold value is designated by a dashed line).

After a period of growth (times A-B), the malicious activity may cease (times B-A) yet the degree of harmfulness will not decline, but only continue to grow during any malicious activity of the executable file. At a certain time, the degree of harmfulness will become greater than the criterion of harmfulness (time D) and the behavior of the executable file will be recognized as malicious and in consequence the file itself will be recognized as malicious.

The time of recognizing the file as malicious might occur immediately after the manifesting of malicious activity, since the described approach responds well to a smooth growth in the degree of harmfulness, which occurs both during prolonged, clearly manifested malicious activity of the executable file, and during frequent, episodic, less-pronounced malicious activity.

In the event that the malicious activity occurs episodically (left side of the graph 312), the calculated degree of harmfulness over time might reach the value after which a verdict is pronounced as to the harmfulness of the behavior of the executable file and the harmfulness of the executable file itself.

In the case when the degree of harmfulness is calculated not on the basis of each behavior pattern formed (for example, because the performance of the computing device is low), a situation is possible where the degree of harmfulness will be calculated at time A (when the malicious activity commences) and time C (when the malicious activity is finished), but will not be calculated at time B (when malicious activity is occurring); nevertheless since the degree of harmfulness changes monotonically, the calculated degrees of harmfulness will only increase their values and at time C the degree of harmfulness will exceed the criterion of harmfulness, the activity of the executable file will be recognized as malicious, and consequently the malicious file will be detected.

The graph 321 shows the dynamics of an arbitrary change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which are also executable during the execution of malicious files (for example, deletion of files, transfer of data in a computer network, and so on), therefore the calculated degree of harmfulness differs from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness), after the passing of which the behavior of the executable file will be considered to be malicious (in the graph, this threshold value is designated by a dashed line), but it might exceed the criterion of safety, so that the file may cease to be considered safe and become "suspicious".

After a period of growth, the malicious activity may cease and the degree of harmfulness will again tend toward 0 (time C).

In the case when the degree of harmfulness is calculated not on the basis of each behavior pattern formed (for example, because the performance of the computing device is low), a situation is possible where the degree of harmfulness will be calculated at time B (when the activity is most similar to malicious, i.e., becomes "suspicious") but not at time A (when the "suspicious" activity increases) or at time C (when the "suspicious" activity is decreasing), so that the calculated degrees of harmfulness will exceed the criterion of safety, the activity of the executable file will be recognized as "suspicious" (it will not be considered safe), and consequently the safe file will not be recognized as safe.

The graph 322 shows the dynamics of a monotonic change in the degree of harmfulness as a function of the number of behavior patterns formed during the execution of a safe file.

In the beginning, upon executing said file, the number of behavior patterns formed is not large, and what is more there is no malicious activity as such for the executable file, although "suspicious" commands might be executed, which are also executable during the execution of malicious files (for example, deletion of files, transfer of data in a computer network, and so on), therefore the calculated degree of harmfulness differs from 0 and does not exceed the predetermined threshold value (hereinafter, the criterion of safety), after passing which the behavior of the executable file ceases to be considered safe (on the graph, this threshold value is designated by a broken line).

However, in time the malicious activity of the executable file grows on account of the execution of a large number of "suspicious" commands and the degree of harmfulness begins to approach 1, while the degree of harmfulness might not reach the predetermined threshold value (hereinafter, the criterion of harmfulness), after the passing of which the behavior of the executable file will be considered to be malicious (in the graph, this threshold value is designated by a dashed line), and also it might not exceed the criterion of safety, so that the file will continue to be considered safe.

After a period of growth (times A-B), the malicious activity may cease (times B-A) yet the degree of harmfulness will not decline, but only continue to grow during any malicious activity of the executable file, yet not exceed the coefficient of safety, so that the activity of the executable file will be recognized as safe and in consequence said file will be recognized as safe.

In the case when the degree of harmfulness is calculated not on the basis of each behavior pattern formed (for example, because the performance of the computing device is low), a situation is possible where the degree of harmfulness will be calculated at time B (when the activity is most similar to malicious, i.e., becomes "suspicious") but not at time A (when the "suspicious" activity increases) or at time C (when the "suspicious" activity is decreasing); nevertheless since the degree of harmfulness changes monotonically, the calculated degrees of harmfulness will only increase their values, at times A, B, C the degrees of harmfulness will not exceed the criterion of safety, the activity of the executable file will be recognized as safe, and consequently the safe file will be recognized as safe.

The time of recognizing the file as "suspicious" might not occur after the manifesting of "suspicious" activity, since the described approach affords a smooth growth in the degree of harmfulness, which makes it possible to avoid sharp peaks in the growth of the degree of harmfulness.

Figure 4:
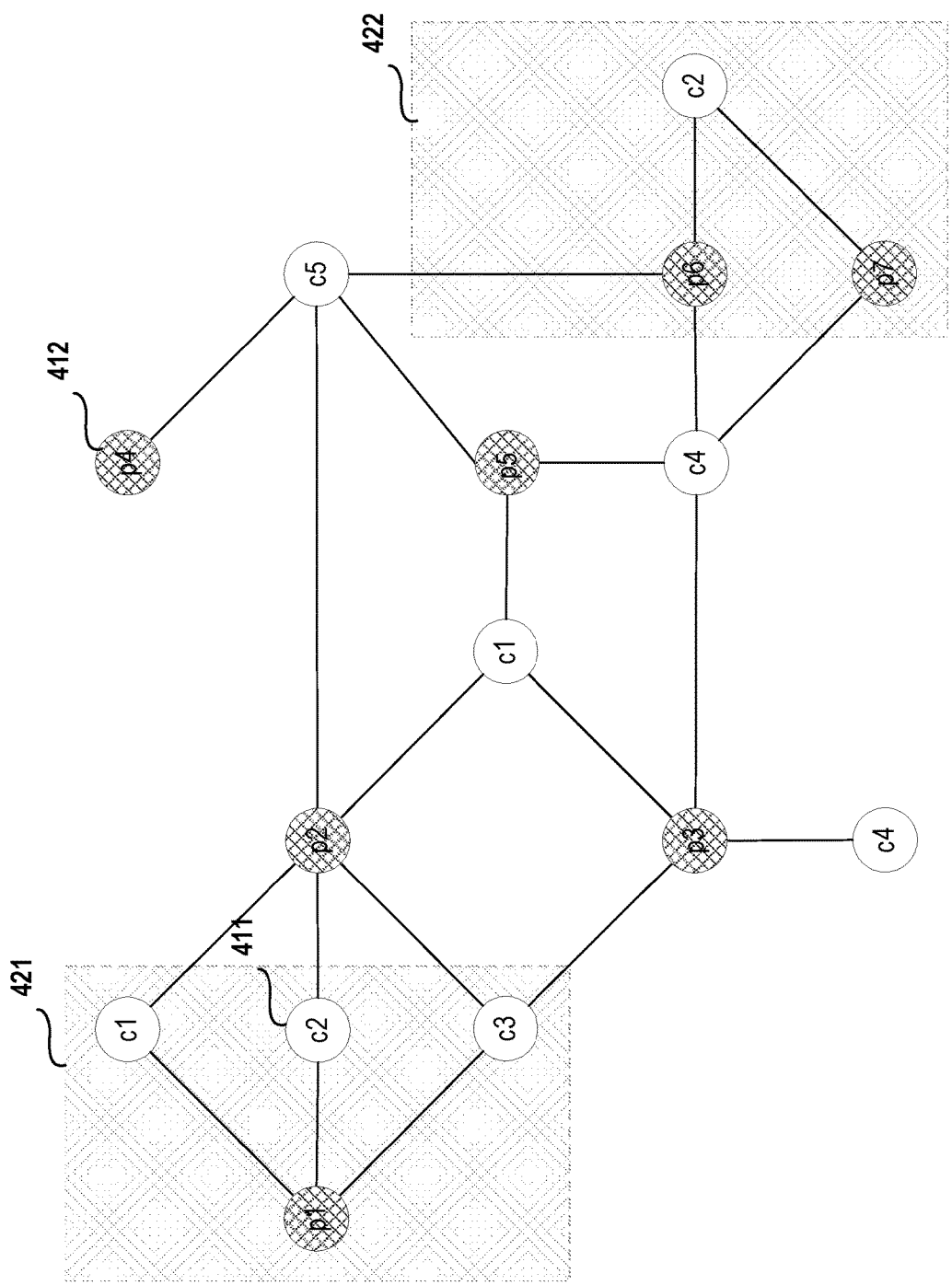
FIG. 4 shows an example of the diagram of relations between the elements of behavior patterns.

FIG. 4 shows an example of the diagram of relations between the elements of behavior patterns.

The example of the diagram of relations between the elements of behavior patterns contains commands 411 (clear circles), parameters 412 (hatched circles), an example of a behavior pattern with one parameter 421, and an example of a behavior pattern with one command 422.

During the execution of a file, the commands 411 were intercepted and the parameters 412 describing them were determined:

CreateFile 0x24e0da54 '.dat'
    {c1, p1, p2}
ReadFile 0x24e0da54 '.dat'
    {c2, p1, p2}
DeleteFile 0x24e0da54 '.dat' 'c:\'
    {c3, p1, p2, p3}
CreateFile 0x708a0b32 '.dat' 0x3be06520
    {c1, p2, p3, p5}
WriteFile 0x708a0b32
    {c4, p3}
WriteFile         0x708a0b32         0x3be06520 0x9902a18d1718b5124728f9 0
    {c4, p3, p5, p6, p7}
CopyMemory 0x3be06520 0x9902a18d1718b5124728f9
    {c5, p4, p5, p6}
ReadFile 0x9902a18d1718b5124728f9 0 {c2, p6, p7}

On the basis of the mentioned commands 411 and parameters 412, behavior patterns (421, 422) are formed and the relations between the elements of the behavior patterns are determined.

In a first step, patterns are formed containing one command 411 and one parameter 412 describing that command:

| | |
|---|---|
| {c1, p1} | {c3, p2} |
| {c1, p2} | {c3, p3} |
| {c1, p3} | {c4, p3} |
| {c1, p5} | {c4, p5} |
| {c2, p1} | {c4, p6} |
| {c2, p2} | {c4, p7} |
| {c2, p6} | {c5, p4} |
| {c2, p7} | {c5, p5} |
| {c3, p1} | {c5, p6} |

In the example shown, 19 behavior patterns have been formed on the basis of 8 intercepted commands (with the parameters describing them).

In the second step, patterns are formed which contain one parameter 412 and all the commands 411 which can be described by that parameter 412:

| | |
|---|---|
| {c1, c2, c3, p1} | {c1, c3, c4, p3} |
| {c1, c2, c3, p2} | {c5, p4} |
| {c1, c4, c5, p5} | {c2, c4, p7} |
| {c2, c4, c5, p6} | |

In the example shown, 7 behavior patterns have been formed in addition on the basis of 8 intercepted commands (with the parameters describing them).

In the third step, patterns are formed which contain several parameters 412 and all the commands 411 which can be described by those patterns 412:

| {c1, c2, c3, p1, p2} | {c2, c4, p6, p7} |
| {c4, c5, p5, p6} | |

In the example given, 3 behavior patterns have been formed in addition on the basis of 8 intercepted commands (with the parameters describing them).

Figure 5:
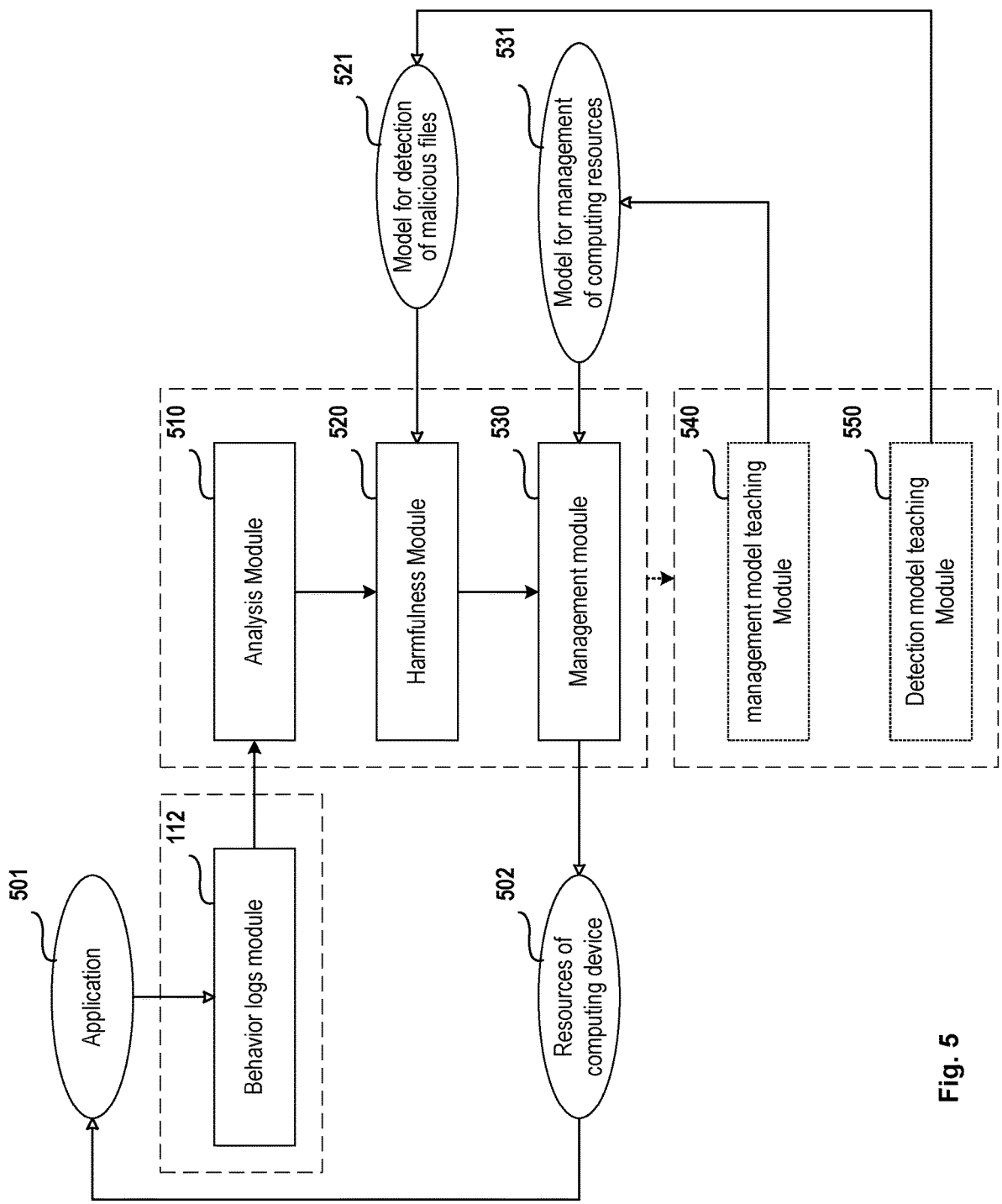
FIG. 5 shows the structural diagram of the system of managing computing resources for detection of malicious files.

FIG. 5 shows the structural diagram of the system of managing computing resources for detection of malicious files.

The structural diagram of the system for detection of malicious files with the use for a trained model for detection of malicious files consists of an application 501, the resources of a computing device 502, the behavior log module 112, the means of analysis of a behavior log 510, the harmfulness module 520, the model for detection of malicious files 521, the management module 530, the model for management of computing resources 531, the management model teaching module 540, and the detection model teaching module 550.

The described system of managing computing resources for detection of malicious files runs on a computing device, for example, on a user's computing device, such as a mobile telephone, a notebook, or a personal computer.

On the mentioned computing device there is additionally implemented at least one application 501. For example, the application Microsoft Word is implemented on a personal computer under the control of the operating system Windows 10.

In one exemplary aspect, the application 501 is a collection of files, at least one of which:
 is executable;
 constitutes a script designed to be executed by an outside application.

The behavior log module 112 is designed to:
intercept at least one command at least during:
 the execution of the application 501 on the computing device;
 the emulation of the execution of the application 501 on the computing device;
determine for each intercepted command at least one parameter describing that command;
form on the basis of the intercepted commands and the determined parameters a behavior log for that application 501;
send the formulated behavior log to the analysis module 510.

In one exemplary aspect, the behavior log is a set of executable commands (hereinafter: command) of the application 501, where each command corresponds to at least one parameter describing that command (hereinafter: parameter).

In yet another exemplary aspect, separate behavior logs are formed on the basis of the intercepted commands being executed in different threads, and afterwards before the analysis said behavior logs may be combined into a single behavior log.

In yet another exemplary aspect, the intercepting of commands of the application being executed 501 and the determination of the parameters of the intercepted commands are done on the basis of an analysis of the performance of the computing device on which the system of managing computing resources for detection of malicious files is running, including at least:
 a determination as to whether it is possible to analyze the application being executed 501 for harmfulness (carried out with the aid of the analysis module 510, the harmfulness module 520 and the management module 530) up to the time when the next command will be intercepted;
 a determination as to whether the analysis of the application being executed 501 for harmfulness will result in a lowering of the computing resources 502 of the mentioned computing device below a predetermined threshold value, the resources of the computing device being at least:
  the performance of that computing device, characterizing at least:
   the number of cycles required by the processor (CPU) of that computing device to perform previously scheduled operations;
   the number of quanta of processor time (scheduler processor time slice) which can be allocated by the operating system under whose control that computing device is running, to perform previously scheduled operations, particularly, or entire applications 501 in general;
   the time needed by the processor of that device to perform previously scheduled operations, particularly, or entire applications 501 in general;
  the volume of free RAM of that computing device;
  the volume of free space on information storage media of that computing device (such as hard disks);
  the bandwidth of the computer network to which that computing device is connected.

In order to increase the performance of the system of managing computing resources for detection of malicious files, the behavior log not containing all the executable commands of the application being executed 501 may be analyzed, since the entire sequence of actions carried out to analyze the application 501 for harmfulness takes up more time than the interval between two consecutively executed commands of the application being executed 501.

For example, the commands of the application being executed 501 are carried out (and consequently intercepted) every 0.001 s, but the analysis of the application 501 for harmfulness takes 0.15 s, so that all the commands intercepted during that interval of time will be ignored, and thus it is enough to intercept only every 150th command.

The analysis module 510 is designed to:
 form at least one behavior pattern on the basis of the commands and parameters selected from the behavior log created which can be executed on the computing device (hereinafter, applications), wherein the behavior pattern represents a set of at least one command and a parameter describing all the commands in that set;
 calculate the convolution of the behavior pattern so formulated;
 send the calculated convolution to the harmfulness module 520.

In one exemplary aspect, the calculation of the convolution of the formulated behavior patterns is done on the basis of a predetermined convolution function, such that the inverse convolution function of the result of that convolution function on all of the formulated behavior patterns has a degree of similarity with that behavior pattern which is greater than a given value.

The forming and use of convolution functions (calculation of the convolution) are described in greater detail in FIG. 1, FIG. 2.

The harmfulness module 520 is designed to:
calculate the degree of harmfulness of the applications on the basis of an analysis of the obtained convolution with the aid of the model for detection of malicious files 521, where the degree of harmfulness of the applications is a number value characterizing the probability that malicious activity will be manifested by the time of computing said degree of harmfulness of the applications;
send the calculated degree of harmfulness of the applications to the management module 530.

In one exemplary aspect, the model for detection of malicious files 521 has been previously trained by the method of machine learning on at least one safe file and malicious file.

In yet another exemplary aspect, the method of machine learning of the model for detection of malicious files 521 is at least the method:
gradient boosting on decision-making trees;
decision-making trees;
k-NN nearest neighbors;
support vectors.

In yet another exemplary aspect, the method of teaching the model for detection of malicious files 521 ensures a monotonic variation in the degree of harmfulness of the applications dependent on the variation in the number of behavior patterns formulated on the basis of the analysis of the behavior log.

The machine teaching of the model for detection of malicious files has been described in more detail in FIG. 1 to FIG. 4.

The management module 530 is designed to manage the computing resources 502 which are used to ensure the security of the mentioned computing device (hereinafter, resources), dependent on the obtained degree of harmfulness of applications, so that the degree of harmfulness of applications computed after the aforementioned management of resources 502 is in a predetermined range of values, while in the event of an increase in the obtained degree of harmfulness of applications beyond a predetermined threshold value, it sends a request to allocate additional resources of the computing device, and in the event of a dropping of the obtained degree of harmfulness below a predetermined threshold value, it sends a request to free up previously allocated resources of the computing device.

In one exemplary aspect, the security of the computing device is determined by the ability to perform malicious activity on that computing device, and is characterized by the degree of harmfulness of an application running on that computing device.

For example, on a user's notebook (acting as the described computing device) running under the control of the operating system Microsoft Windows 10, there is no connection to a computer network (such as the Internet), so that the mentioned operating system cannot be attacked by malicious applications using a computer network for their spreading (such as Net-Worm, a computer worm using the vulnerabilities of applications, including the operating system, which are running on a computing device), and therefore the user cannot suffer harm (such as theft of confidential data, encryption of important electronic documents, disabling of the notebook, and so on). Thus, the degree of harmfulness of applications running on this notebook is low, and as a result the security of that notebook is high).

In yet another exemplary aspect, the management of the computing resources 502 includes at least:
the allocating of additional computing resources 502 provided to the applications 501 being executed on that computing device;
the freeing up of computing resources 502 previously allocated and provided to the applications 501 being executed on that computing device;
the management of the security policies for working with computing resources 502 by the applications 501 being executed on that computing device.

For example, the rights of an application to write data (as part of the security policy) lower the security of the computing device on which that application is running, since they make it possible for that application to inflict damage on important user data, and they should not be granted to an application needlessly (for example, the application "Calculator" should not have rights of writing data on a hard disk, since no writing is expected in the working of this application, and even if malicious code were to be embedded in the application "Calculator", that application still could not inflict harm on the user's data).

In yet another example, the allocating of such additional resources 502 as processor time and free RAM will enable the antivirus programs running on the computing device to work more efficiently. For example, when additional processor time is available, a heuristic model is able to perform an emulation of applications with a greater depth of emulation, while a signature module when additional free memory is available is able to perform an antivirus scan with a larger number of antivirus signatures, which increases the accuracy of detection of malicious files.

In yet another example, the freeing up of computing resources 502 from certain applications makes it possible to allocate them to other applications. For example, the application Notepad was allocated 64 Mb of RAM, even though its running only requires 16 Mb; on the other hand the signature antivirus module has been allocated 96 Mb of RAM, although it needs 128 Mb (i.e., lacking 32 Mb) for effective working (i.e., with maximum speed when using the existing signature database), and therefore to increase the security of the computing device on which the application Notepad and the antivirus are running, 32 Mb of RAM is freed up from Notepad and 32 Mb is allocated to the signature antivirus module.

In yet another exemplary aspect, the management of the computing resources 502 is done on request from the management module 530 at least with the help of:
the operating system under whose control that computing device is running;
the resources provided to the applications 501 being executed on that computing device and utilizing said computing resources 502.

For example, free RAM may be allocated by a call of the system API function VirtualAlloc, and the freeing up of allocated memory by the API function VirtualFree. The operating system processes these functions and performs the actions by itself.

In another example, the RAM may be initially allocated by the above-described method, and then an application itself will allocate or free up memory from the allocated volume, without accessing the operating system (so-called "heaps"). A similar logic also applies to other types of computing resources 502.

In yet another exemplary aspect, the computing resources are at least:

free RAM used for storing the antivirus databases and the results of analysis of files for harmfulness;

free space on information storage media of the mentioned computing device;

processor time allocated for the running of applications 501 on the mentioned computing device, including those providing the security for the mentioned computing device;

network resources allocated to provide a controlling exchange of data between applications 501 running on the mentioned computing device.

In yet another exemplary aspect, the management module 530 additionally manages the computing resources 502 with the aid of the model for management of computing resources 531 which has been previously trained with the use of methods of machine learning, where the model for management of computing resources 531 constitutes a set of rules for determining such parameters of the computing resources 531 so that the degree of harmfulness of applications 501 running on the computing device after performing the management of those computing resources 502 on the basis of the computed parameters does not surpass a predetermined threshold value.

The degree of harmfulness of applications 501 may satisfy the above-described attributes for different values of the parameters of the computing resources 502, and therefore the training of the model for management of computing resources 531 pursues the goal of reducing the allocated computing resources 502 needed so that the degree of harmfulness of applications 501 does not surpass a predetermined threshold value, i.e., after performing the training of the model for management of computing resources 531 fewer computing resources 502 will be allocated than before performing the training of that model for management of computing resources 531.

For example, the degree of harmfulness of an application 501 may be lower than a predetermined threshold value of 0.23 when free RAM is allocated to that application in a volume of 100 Mb, whereupon if that volume of RAM is allocated, the degree of harmfulness of the application 501 will be equal to 0.13, which is significantly lower than 0.27, and therefore the allocation of the full 100 Mb of RAM would be a needless expenditure of computing resources 502. During the machine learning of the model for management of computing resources 531, the use of the mentioned model will in time allow increasingly less RAM to be allocated, until such time as the volume of RAM allocated becomes a minimum for achieving a degree of harmfulness of the application 501 equal to 0.23. The steps of the machine learning of the described model for management of computing resources 531 are presented in the following table:

| Step of machine learning of the model for management of computing resources | Volume of RAM allocated | Degree of harmfulness of application |
|---|---|---|
| 1 | 100 | 0.13 |
| 2 | 75 | 0.15 |
| 3 | 50 | 0.19 |
| 4 | 20 | 0.21 |
| 5 | 7 | 0.23 |

In yet another exemplary aspect, the model for management of computing resources 531 is additionally trained on a known set of applications 501. Said model for management of computing resources 531 is retrained already when using the system of managing computing resources for detection of malicious files.

For example, for the preliminary machine learning of the model for management of computing resources 531, a training selection of malicious and safe applications is used.

In yet another example, the training selection of applications contains 10000 applications, of which 7200 are malicious and 2800 are safe. After the model for management of computing resources 531 has been trained, it is verified on a test selection of applications containing 1500 applications, of which 250 are malicious and 1250 are safe.

In yet another exemplary aspect, the management of the computing resources is done on the basis of parameters of the computing resources whose values are calculated with the use of predetermined algorithms, including the use of the model for management of computing resources.

In yet another exemplary aspect, the management module 530 is additionally designed to manage the computing resources 502 which are used for the detection (for example, by antivirus applications) of malicious files on the computing device, dependent on the obtained degree of harmfulness of applications.

For example, the application 501 may be an antivirus, while the working efficiency of this antivirus (i.e., the working speed, the number of errors of the first and second kind in the detection of malicious files, and so on) depends on the computing resources allocated to that antivirus. The antivirus may contain:

a heuristic analysis module, whose working efficiency depends on the processor time allocated to the antivirus and the volume of free memory;

a signature analysis module, whose working efficiency depends on the volume of free memory;

a proactive protection module, the efficiency of which depends on the processor time.

In yet another exemplary aspect, the degree of harmfulness of applications is maintained in a predetermined range by the detection and subsequent neutralization of malicious files.

The management model teaching module 540 is designed for machine learning (retraining) of the model for management of computing resources 531 so that when the computing resources 502 are managed with the help of the aforementioned trained model, the use of those computing resources 502 is minimal.

For example, the model for management of computing resources 531 is trained on a known set of applications, where said set of applications contains 60% safe applications and 40% malicious applications.

In yet another exemplary aspect, the management model teaching module 540 is additionally designed to:

perform a verification of the trained model for management of computing resources on the obtained behavior logs formed on the basis of the analysis of applications from the test selection of files in order to determine the correct management of the computing resources 502;

in the event of a negative result, retrain the model for management of computing resources 531 on new teaching selections of applications.

The detection model teaching module 550 is designed for machine learning (retraining) of the model for detection of malicious files 521 on the basis of the analysis of at least one created behavior log, said machine learning being performed in the event that the degree of harmfulness of applications turns out to be above a predetermined threshold value after the performance of the last management of resources 502.

Figure 6:
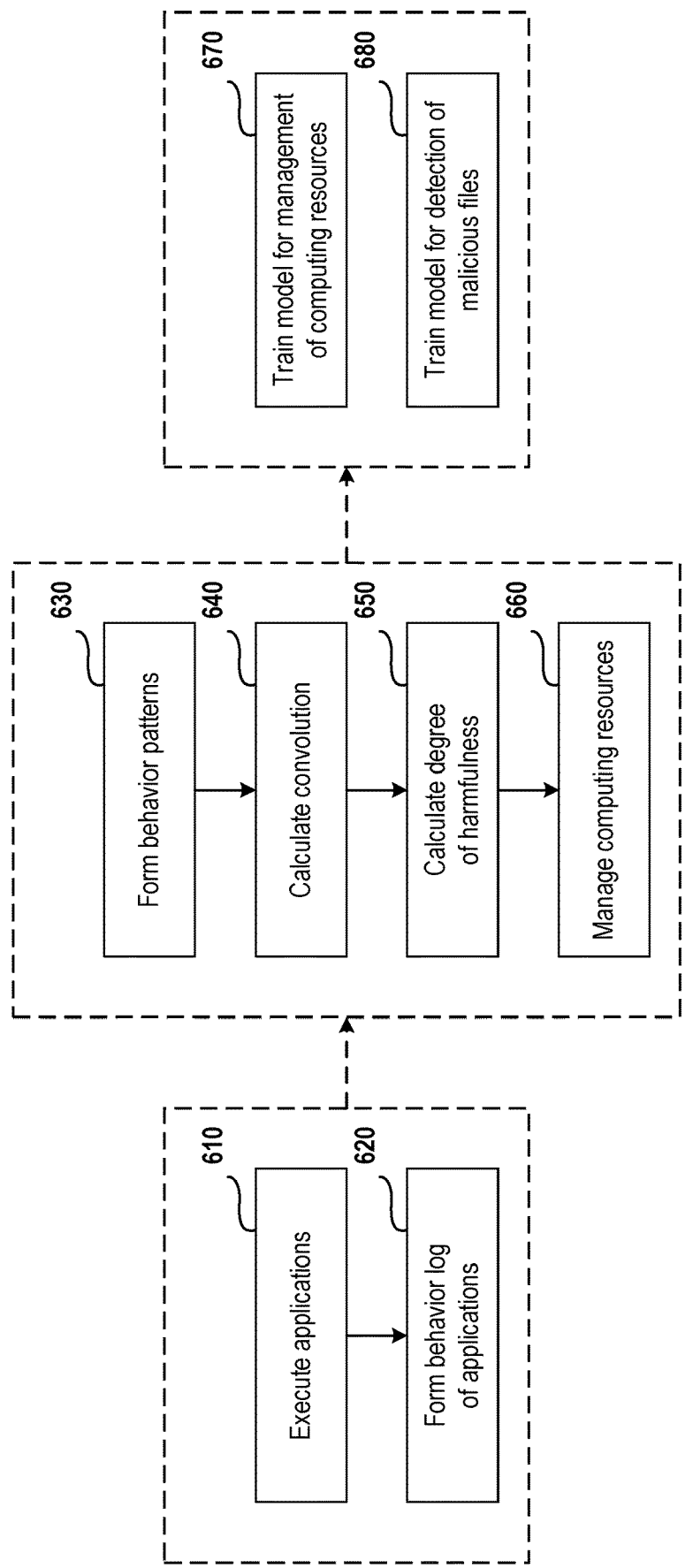
FIG. 6 shows the structural diagram of the method of managing computing resources for detection of malicious files.

FIG. 6 shows the structural diagram of the method of managing computing resources for detection of malicious files.

The structural diagram of the method of managing computing resources for detection of malicious files contains a step 610, in which applications are executed, a step 620, in which a behavior log is formed, a step 630, in which the behavior patterns are formed, a step 640, in which a convolution is computed, a step 650, in which the degree of harmfulness is computed, a step 660, in which the computing resources are managed, a step 670, in which the model for management of computing resources is trained, and a step 680, in which the model for detection of malicious files is trained.

In step 610, the behavior log module 112 is used to at least:
  execute the file being analyzed 501;
  emulate the execution of the file being analyzed 501.

In step 620, the behavior log module 112 is used to form a behavior log for the file being analyzed 501, for which:
  at least one executable command is intercepted;
  for each intercepted command at least one parameter describing said command is determined;
  on the basis of the intercepted commands and the parameters so determined, the behavior log of that file 501 is formed.

In step 630 the analysis module 510 is used to form at least one behavior pattern on the basis of the commands and parameters selected from the behavior log created in step 620 that are being executed on the computing device (hereafter, applications), the behavior pattern being a set of at least one command and a parameter which describes all the commands of that set.

In step 640 the analysis module 510 is used to compute the convolution of the behavior pattern formed in step 630.

In step 650 the harmfulness module 520 is used to compute the degree of harmfulness of the applications on the basis of the analysis of the convolution computed in step 640 with the aid of the model for detection of malicious files, the degree of harmfulness of the applications being a number value characterizing the probability that malicious activity will be manifested by the time of computing degree of harmfulness of the applications.

In step 660 the management module 530 is used to manage the computing resources which are being used to provide the security of the mentioned computing device (hereinafter, resources), dependent on the degree of harmfulness of applications computed in step 650 so that the degree of harmfulness of applications computed after said managing of the resources is within a predetermined range of values, where in the event of an increase in the obtained degree of harmfulness of applications beyond a predetermined threshold value, it sends a request to allocate additional resources of the computing device, and in the event of a dropping of the obtained degree of harmfulness below a predetermined threshold value, it sends a request to free up previously allocated resources of the computing device.

In step 670 the management model teaching module 540 additionally uses methods of machine learning to train the model for management of computing resources so that when the computing resources are managed with the help of the aforementioned trained model, the use of those computing resources is minimal.

In step 680 the detection model teaching module 550 further trains with the aid of methods of machine learning a model for detection of malicious files on the basis of an analysis of at least one behavior log formed in step 620, said machine learning being done in the event that the calculated degree of harmfulness of applications turns out to be higher than a predetermined threshold value after performing the last management of resources in step 660.

Figure 7:
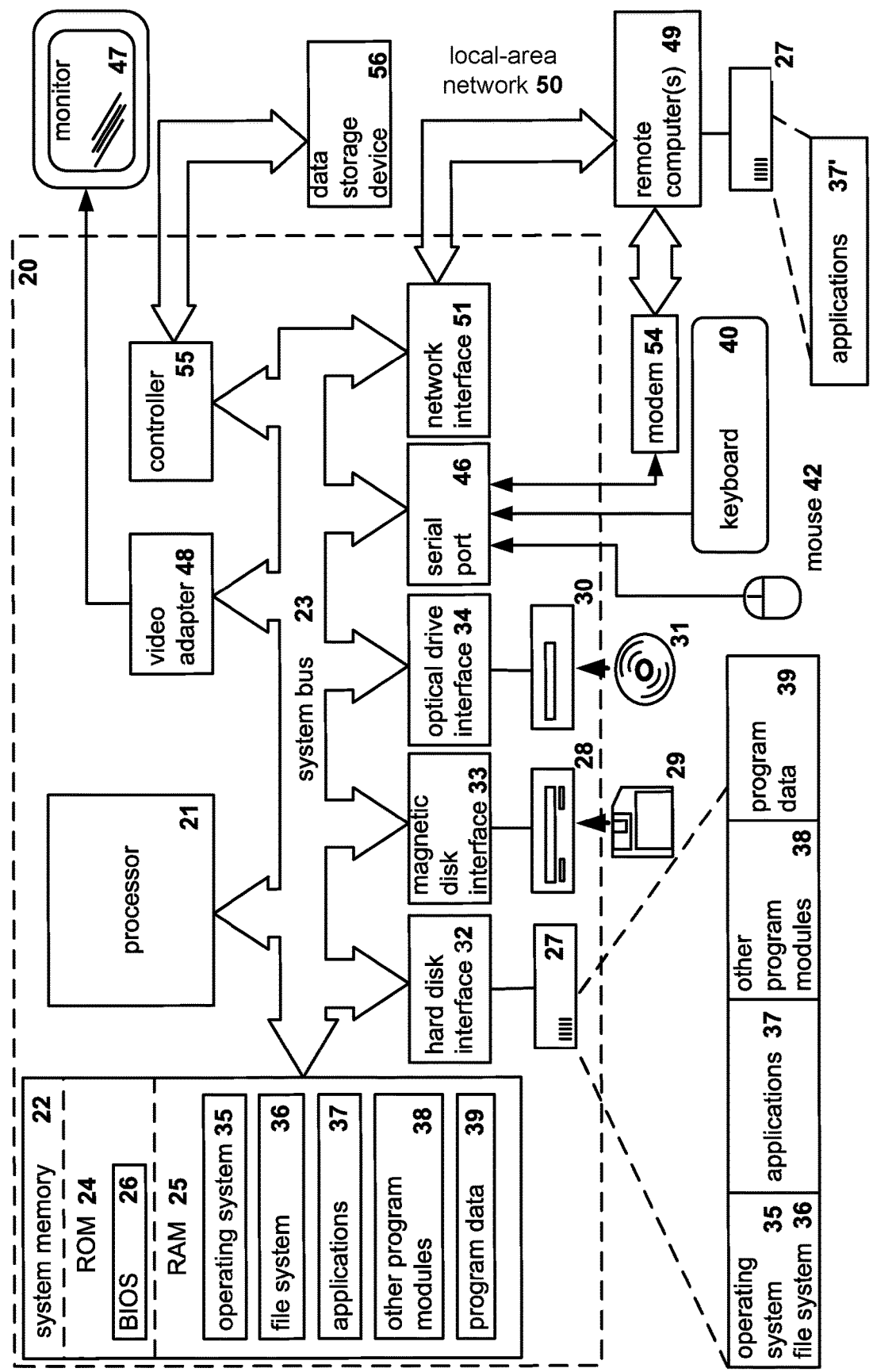
FIG. 7 shows an example of a general-purpose computer system, a personal computer or a server.

FIG. 7 is a diagram illustrating a general-purpose computer system on which aspects of systems and methods for allocating of computer resources for the detection of malicious files may be implemented in accordance with an exemplary aspect.

As shown, the computer system 20 (which may be a personal computer or a server) includes a central processing unit 21, a system memory 22 and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

The computer system 20 includes a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, or the like. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

The computer system 20 may operate in a network environment, using a network connection to one or more remote computers 49. The remote computer (or computers)

49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, supra). Accordingly, each module may be realized in a variety of suitable configurations, and should not be limited to any particular implementation exemplified herein.

In the interest of clarity, not all of the routine features of the aspects are disclosed. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A system for allocating computer resources for detection of malicious files comprising:
a hardware processor configured to:
form at least one behavior pattern grouping selected commands with shared parameters;
apply a hash function on the at least one of the formed behavior pattern to obtain computed parameters;
calculate a degree of harmfulness based on the obtained computed parameters using the hash function and a model for detection of malicious files, wherein the degree of harmfulness is a number value characterizing a probability that a malicious activity will be manifested by a time of computing said degree of harmfulness, and wherein the model for detection is a machine learning model previously trained using computed parameters of previous behavior patterns on which the hash function was applied to output degrees of harmfulness; and
allocate the computing resources used to ensure a security of a computing device based on the calculated degree of harmfulness, wherein the allocating of the computing resources comprises freeing up resources previously allocated for detection of malicious files when the degree of harmfulness is less than a predetermined threshold value.

2. The system of claim 1, wherein the allocating of the computing resources comprises allocating additional resources for detection of malicious files when the degree of harmfulness is greater than a predetermined threshold value.

3. The system of claim 1, wherein the commands are selected from a behavior log that includes a totality of executable commands from the file.

4. The system of claim 1, wherein the commands and parameters are selected from the a behavior log based on rules which include at least one of selecting:
every i-th command in succession and the parameters describing the selected command, wherein an increment i is specified in advance;
the commands executed after a predetermined period of time from a previous selected command, and the parameters describing the selected command;
the commands and the parameters describing the commands that are executed in a predetermined time interval from a start of execution of the file;
the commands from a predetermined list and the parameters describing the commands;

the parameters from a predetermined list and the commands described by the selected parameters; and when the number of command parameters is greater than a predetermined threshold value, the first or a random k parameters of commands.

5. The system of claim 1, wherein the model for detection is retrained periodically.

6. The system of claim 1, wherein the hash function is a function having an inverse function.

7. A method for allocating computer resources for detection of malicious files, the method comprising:

forming at least one behavior pattern grouping selected commands with shared parameters;

applying a hash function on the at least one of the formed behavior pattern to obtain computed parameters;

calculating a degree of harmfulness based on the obtained computed parameters using the hash function and a model for detection of malicious files, wherein the degree of harmfulness is a number value characterizing a probability that a malicious activity will be manifested by a time of computing said degree of harmfulness, and wherein the model for detection is a machine learning model previously trained using computed parameters of previous behavior patterns on which the hash function was applied to output degrees of harmfulness; and allocating the computing resources used to ensure a security of a computing device based on the calculated degree of harmfulness, wherein the allocating of the computing resources comprises freeing up resources previously allocated for detection of malicious files when the degree of harmfulness is less than a predetermined threshold value.

8. The method of claim 7, wherein the allocating of the computing resources comprises allocating additional resources for detection of malicious files when the degree of harmfulness is greater than a predetermined threshold value.

9. The method of claim 7, wherein the commands are selected from a behavior log that includes a totality of executable commands from the file.

10. The method of claim 7, wherein the commands and parameters are selected from the a behavior log based on rules which include at least one of selecting:

every i-th command in succession and the parameters describing the selected command, wherein an increment i is specified in advance;

the commands executed after a predetermined period of time from a previous selected command, and the parameters describing the selected command;

the commands and the parameters describing the commands that are executed in a predetermined time interval from a start of execution of the file;

the commands from a predetermined list and the parameters describing the commands;

the parameters from a predetermined list and the commands described by the selected parameters; and when the number of command parameters is greater than a predetermined threshold value, the first or a random k parameters of commands.

11. The method of claim 7, wherein the model for detection is retrained periodically.

12. The method of claim 7, wherein the hash function is a function having an inverse function.

13. A non-transitory computer-readable medium storing thereon instructions for allocating computer resources for detection of malicious files, the instructions comprising instructions for:

forming at least one behavior pattern grouping selected commands with shared parameters;

applying a hash function on the at least one of the formed behavior pattern to obtain computed parameters;

calculating a degree of harmfulness based on the obtained computed parameters using the hash function and a model for detection of malicious files, wherein the degree of harmfulness is a number value characterizing a probability that a malicious activity will be manifested by a time of computing said degree of harmfulness, and wherein the model for detection is a machine learning model previously trained using computed parameters of previous behavior patterns on which the hash function was applied to output degrees of harmfulness; and allocating the computing resources used to ensure a security of a computing device based on the calculated degree of harmfulness, wherein the allocating of the computing resources comprises freeing up resources previously allocated for detection of malicious files when the degree of harmfulness is less than a predetermined threshold value.

14. The non-transitory computer-readable medium of claim 13, wherein the allocating of the computing resources comprises allocating additional resources for detection of malicious files when the degree of harmfulness is greater than a predetermined threshold value.

15. The non-transitory computer-readable medium of claim 13, wherein the commands are selected from a behavior log that includes a totality of executable commands from the file.

16. The non-transitory computer-readable medium of claim 13, wherein the commands and parameters are selected from the a behavior log based on rules which include at least one of selecting:

every i-th command in succession and the parameters describing the selected command, wherein an increment i is specified in advance;

the commands executed after a predetermined period of time from a previous selected command, and the parameters describing the selected command;

the commands and the parameters describing the commands that are executed in a predetermined time interval from a start of execution of the file;

the commands from a predetermined list and the parameters describing the commands;

the parameters from a predetermined list and the commands described by the selected parameters; and when the number of command parameters is greater than a predetermined threshold value, the first or a random k parameters of commands.

17. The non-transitory computer-readable medium of claim 13, wherein the model for detection is retrained periodically.

18. The non-transitory computer-readable medium of claim 13, wherein the hash function is a function having an inverse function.

* * * * *